United States Patent [19]
Yamamoto et al.

[11] Patent Number: 5,962,607
[45] Date of Patent: Oct. 5, 1999

[54] METHOD OF VAPOR PHASE POLYMERIZATION, VAPOR PHASE POLYMERIZER AND BLOWER

[75] Inventors: Ryoichi Yamamoto; Toshihiro Okano, both of Waki-cho; Mitsunori Ichimura, Ichihara; Yoshiaki Kikuchi, Waki-cho, all of Japan

[73] Assignee: Mitsui Chemicals, Inc., Tokyo, Japan

[21] Appl. No.: 08/856,289

[22] Filed: May 14, 1997

[30] Foreign Application Priority Data

| May 14, 1996 | [JP] | Japan | 8-119355 |
| Sep. 30, 1996 | [JP] | Japan | 8-258450 |
| Mar. 21, 1997 | [JP] | Japan | 9-068233 |

[51] Int. Cl.⁶ .................................................. C08F 2/34
[52] U.S. Cl. .............................. 526/88; 526/901; 422/139
[58] Field of Search ................... 526/88, 901; 422/139

[56] References Cited

U.S. PATENT DOCUMENTS

| 3,275,225 | 9/1966 | Schultz . | |
| 5,462,999 | 10/1995 | Griffin et al. | 526/68 |
| 5,668,228 | 9/1997 | Chinh et al. | 526/67 |

FOREIGN PATENT DOCUMENTS

| 0468651 | 1/1992 | European Pat. Off. . |
| 0634421 | 1/1995 | European Pat. Off. . |
| 1503579 | 3/1970 | Germany . |
| 08100008 | 4/1996 | Japan . |

OTHER PUBLICATIONS

Patent Abstracts of Japan, vol. 96, No. 8, Aug. 30, 1996 & JP 08 100008 A (Kobe Steel Ltd.) Apr. 16, 1996—& Database WPI Section Ch, Week 9625 Derwent Publications Ltd., London, GB.
Patent Abstracts of Japan, vol. 97, No. 2, Feb. 28, 1997 & JP 08 284881 A (Mitsubishi Chem. Corp. & Kobe Steel Ltd.) Oct. 29, 1996 & Database WPI Section PQ, Week 9702.
Patent Abstracts of Japan, vol. 96, No. 6, Jul. 31, 1995 & JP 07 071398 A (Kobe Steel Ltd.).

Primary Examiner—David W. Wu
Attorney, Agent, or Firm—Sherman and Shalloway

[57] ABSTRACT

A method for vapor phase polymerization comprises blowing a gaseous monomer from a bottom of a fluidized bed reactor through a distributor plate into the reactor by means of a blower while feeding a solid catalyst into the reactor to thereby form a fluidized bed in the reactor and conducting a vapor phase polymerization to produce a polymer or copolymer, wherein the blower has a slide or rotational slide part between its discharge side as a high pressure side and its suction side as a low pressure side in a blower body casing, said slide or rotational slide part being provided with a noncontacted gas leakproof seal part at a clearance ranging from 0.7 to 2.5 mm.

10 Claims, 11 Drawing Sheets

Conventional Vapor Phase Polymerizer

METHOD OF VAPOR PHASE POLYMERIZATION, VAPOR PHASE POLYMERIZER AND BLOWER

FIELD OF THE INVENTION

The present invention relates to a method of polymerizing, for example, an olefin monomer such as ethylene through a vapor phase reaction to thereby obtain a polyolefin such as polyethylene, especially, a method of polymerizing an olefin through a vapor phase reaction. Also, the present invention relates to a vapor phase polymerizer which can suitably be used in the above vapor phase polymerization reaction. Further, the present invention relates to a blower or a compressor (hereinafter referred to as "blower") which can be used in the circulation or cyclone treatment of a powder containing gas, particularly, a blower for vapor phase polymerization which can be used for carrying an unreacted gas which contains powder or for increasing the pressure thereof in the circulation or cyclone treatment of the powder containing unreacted gas to be performed in the above vapor phase polymerization reaction.

BACKGROUND OF THE INVENTION

The vapor phase polymerization method provides a common process for producing a polyolefin such as polyethylene, in which an olefin monomer such as ethylene is polymerized through a vapor phase reaction in the presence of, for example, a titaniferous solid catalyst or metallocene catalyst.

In this vapor phase polymerization method, for example, referring to FIG. 5, a solid catalyst A is fed through a supply line 12 into a fluidized bed reactor 10 and, simultaneously, a gaseous olefin is caused to pass through a supply line 13 and blown thereinto from a bottom of the fluidized bed reactor 10 through a gas distributor plate 11. The gas distributor plate 11 is composed of, for example, a porous plate which has a plurality of through holes, and is arranged in the vicinity of the bottom of the fluidized bed reactor 10. In this way, a fluidized bed (reaction system) 14 is formed and held in the fluid state in the fluidized bed reactor 10, and whereby a polymerization reaction is carried out in the fluidized bed 14. Polymer particles produced by the polymerization reaction in the fluidized bed 14 are continuously discharged through a line 15 from the fluidized bed reactor 10. For example, unreacted gaseous olefin having passed through the fluidized bed 14 of the fluidized bed reactor 10 has its flow rate reduced in a velocity reduction zone 16 provided in an upper part of the fluidized bed reactor 10 and is discharged outside the fluidized bed reactor 10 through a gas outlet 10A disposed at a top of the fluidized bed reactor 10. The unreacted gaseous olefin having been discharged from the fluidized bed reactor 10 is caused to pass through a recycling line 17 and blown into the fluidized bed 14 of the fluidized bed reactor 10. The above gaseous olefin is continuously supplied through a supply line 20 which is combined with the recycling line 17.

The recycling gas such as unreacted gaseous olefin having been discharged from the fluidized bed reactor 10 must be passed through a heat exchanger (cooler) prior to the re-blowing into the fluidized bed 14 of the fluidized bed reactor 10 because of the need of being deprived of heat of polymerization (i.e. heat generated by the polymerization reaction). When this cooler is disposed upstream of a gas recycling device, namely, between the gas outlet of the fluidized bed reactor and the gas recycling device, a condensate of gaseous monomer such as gaseous olefin containing polymer powder which has been generated by cooling by the cooler is fed in misty form to the gas recycling device such as blower (or compressor). As a result, a gas recycling pipe is clogged, and such mist is entrained to the distributor plate and gas recycling pipe of the polymerizer to thereby cause clogging and other serious trouble. Accordingly, in the prior art, it is a common practice to arrange the cooler 19 downstream of the gas recycling device such as blower 18, namely, between the gas recycling device such as blower 18 and the supply line 13 as shown in FIG. 5 in order to not only avoid the above trouble but also enhance the heat exchange efficiency.

However, the arrangement of the above cooler 19 involves the problem that, in accordance with the increase of the amount of recycled gas and the increase of the temperature thereof, the size of the blower must be large, the pipe size must be large and heat insulation promoting equipment and highly heat resistant seal are required with the result that the recycling equipment per se becomes huge.

Blowers for transporting a gas or conducting a cyclone treatment thereof are widely used in chemical and petroleum plants. The blowers are mainly divided into turboblowers in which an impeller is rotated in a gas so that the velocity and pressure of gas passing through the blower are increased by the action of the blade and displacement blowers in which the volume of a gas sealed in a predetermined volume is reduced and the pressure thereof is increased with the use of back pressure. The turboblowers are subdivided into centrifugal blowers in which a gas passes in a radial direction in an impeller and a pressure increase is attained by the centrifugal action of the impeller and axial blowers in which a gas passes in an axial direction in an impeller and a pressure increase is attained by the action of blade lift. The displacement blowers include rotary blowers in which the gas sucked by the rotation of the rotor provided in a casing is pressurized by reducing the volume defined by the inner wall of the casing and the rotor by the rotation of the rotor. The rotary blowers include two-lobe type blowers (Roots blowers) in which two two-lobe rotors are mounted in a differentiated phase in a casing so as to be rotatable without contacting each other and rotated in directions opposite to each other by means of a timing gear to thereby pressurize a gas so that the gas is transported under pressure.

With respect to these blowers, it is a common practice to provide a slide part or rotational slide part positioned between the discharge side thereof as a high pressure side and the suction side thereof as a low pressure side with a contact-type gas leakproof seal such as mechanical seal or a noncontact-type gas leakproof seal such as labyrinth seal, carbon ring seal or oil film seal so that the gas leakage can be prevented (gas edge cut). In particular, the turboblower has a labyrinth seal provided at a rotational slide part positioned between the impeller connected to its main shaft and the suction port, while, in the Roots blower, the gas leakage is prevented by regulating the clearance present between the periphery of each rotor and the inner wall of the casing and the clearance present between the rotors.

Although the labyrinth seal clearance or above rotor clearance varies depending on the type and capacity of the blower in the use of the noncontact type seal, it is generally set at about 0.5 mm in order to minimize the gas leakage and enhance the blower efficiency (for example, compression efficiency).

However, when, for example, a polyolefin powder containing gas is treated with the use of the above blower for recycling a powder containing unreacted gas or conducting a cyclone treatment thereof in the vapor phase polymerization comprising subjecting an olefin monomer such as ethylene to a vapor phase reaction to thereby obtain a polyolefin such as polyethylene, it may occur that a frictional force is generated between the powder and the labyrinth seal, impeller, rotor or inner wall of casing at the time of passing of the powder through the gas leakproof seal clearance and rotor. As a result, the powder passing through the gas leakproof seal clearance and rotor clearance suffers from heat buildup and melts to thereby form stringy melt polymer, which is entrained to the distributor plate and gas recycling pipe of the polymerizer to thereby cause clogging and other serious trouble.

In the vapor phase polymerization in which, as mentioned above, the blower is employed in the transfer of a powder containing gas under pressure or the increase of the pressure thereof for the circulation and cyclone treatment of unreacted gas, powder crushing, deformation and integration may occur at the gas leakproof seal part clearance or rotor clearance between the high pressure part and the low pressure part. As a result, powder having suffered from crushing, deformation and integration remains in the gas leakproof seal part clearance or rotor clearance to thereby cause heat buildup, so that the life of the blower per se is caused to be short. Further, fine particles are formed, so that removal of such fine particles must be included in the after treatment to thereby complicate the process. Further, the above combined powder occasionally unfavorably causes clogging of, for example, gas recycling pipes.

Enlarging the gas leakproof seal part clearance or rotor clearance so as to allow powder to pass therethrough without heat buildup can be contemplated as means for solving the above problem. This is, however, disadvantageous in that an extreme gas leakage occurs at the gas leakproof seal part and the blower suffers from an efficiency drop with the result that plant operating cost is increased to an economic disadvantage.

OBJECT OF THE INVENTION

Therefore, in view of the above circumstances, it is an object of the present invention to provide a method of vapor phase polymerization which is free from the problems that the recycling gas such as unreacted gaseous olefin having been discharged from a fluidized bed reactor becomes stringy melt polymer or combines to become powder to thereby clog gas recycling pipes and that such stringy melt polymer or powder is entrained to the distributor plate and gas recycling pipe of the polymerizer to thereby cause clogging and other trouble.

It is another object of the present invention to provide a vapor phase polymerizer which is free from the problems that, in passing the recycling gas such as unreacted gaseous olefin having been discharged from a fluidized bed reactor through a heat exchanger (cooler) prior to the re-blowing into the fluidized bed of the fluidized bed reactor because of the need of depriving the recycling gas of heat of polymerization (i.e., heat generated by the polymerization reaction), a condensate of, for example, olefin containing polymer powder which has been generated by cooling by the cooler assumes misty form to thereby clog a gas recycling pipe and that such mist is entrained to the distributor plate and gas recycling pipe of the polymerizer to thereby cause clogging and other serious trouble, the above polymerizer thus allowing the recycling equipment per se to be compact.

It is a further object of the present invention to provide a blower in which the above gas leakproof seal part clearance and rotor clearance enable powder contained in a gas to be blown by the blower to pass therethrough without generation of a frictional force and are sized so as to prevent gas leakage, so that the blower is free from the problems that powder suffers from heat buildup and melts into stringy melt polymer and that powder crushing, deformation and integration occur at the above gas leakproof seal part clearance or rotor clearance, which blower does not vibrate irrespective of the presence of mist and finely redisperses mist to thereby enable preventing adhesion thereof to pipes.

SUMMARY OF THE INVENTION

The present invention has been made to solve the above problems in the prior art and attain the objects. Accordingly, in one aspect of the present invention, there is provided a method of vapor phase polymerization, which comprises blowing a gaseous monomer from a bottom of a fluidized bed reactor through a distributor plate into the fluidized bed reactor by means of a blower while feeding a solid catalyst for polymerization into the fluidized bed reactor to thereby form a fluidized bed in the fluidized bed reactor and carrying out a vapor phase polymerization reaction in the fluidized bed to thereby produce a polymer or copolymer, wherein the blower has a slide or rotational slide part between its discharge side as a high pressure side and its suction side as a low pressure side in a blower body casing, the above slide or rotational slide part being provided with a noncontacted gas leakproof seal part at a clearance ranging from 0.7 to 2.5 mm. In the vapor phase polymerization method, the gas leakproof seal part is preferred to have a clearance ranging from 0.9 to 1.2 mm.

By virtue of this constitution, the desired method of vapor phase polymerization can be provided which is free from the problems that the recycling gas such as unreacted gaseous olefin having been discharged from a fluidized bed reactor becomes stringy melt polymer or combines to become powder to thereby clog gas recycling pipes and that such stringy melt polymer or powder is entrained to the distributor plate and gas recycling pipe of the polymerizer to thereby cause clogging and other trouble.

In the vapor phase polymerization method of the present invention, the gaseous monomer fed by the blower may have a component which condenses at a temperature ranging from 50° C. lower than a temperature at which the vapor phase polymerization reaction is conducted in the fluidized bed to the temperature of vapor phase polymerization reaction. Further, in the vapor phase polymerization method, the gaseous monomer may be fed into the fluidized bed at a temperature which is lower than the condensation temperature of the condensing component.

This constitution enables removing at least part of the heat of reaction of the vapor phase polymerization by the latent heat of vaporization and increasing the quantity of heat removed per recycling gas and markedly improves the heat exchange efficiency of the heat exchanger.

Moreover, the vapor phase polymerization of the present invention may be conducted under conditions such that the solid catalyst for polymerization is a solid catalyst for olefin polymerization, the gaseous monomer is a gaseous olefin monomer and an olefin polymer or copolymer is obtained by the vapor phase polymerization reaction in the fluidized bed. Further, in the vapor phase polymerization method, unreacted gaseous monomer may be discharged from the fluidized bed reactor and is caused to pass through a gas recycling path having a heat exchanger disposed upstream thereof and having a blower disposed downstream thereof so that the heat exchanged gaseous monomer is blown into the fluidized bed reactor.

By virtue of this constitution, not only is safe production ensured without the problems that a condensate of, for example, olefin containing polymer powder which has been generated by cooling by the cooler as heat exchanger assumes misty form to thereby clog a gas recycling pipe and that such mist is entrained to the distributor plate and gas recycling pipe of the polymerizer to thereby cause clogging and other serious trouble but also the recycling equipment per se becomes compact to thereby enable reducing production cost.

In another aspect of the present invention, there is provided a vapor phase polymerizer comprising a fluidized bed reactor in which a gaseous monomer is blown from a bottom thereof through a distributor plate with a solid catalyst for polymerization fed thereinto to thereby form a fluidized bed so that a vapor phase polymerization reaction is carried out in the fluidized bed to thereby produce a polymer or copolymer, the above vapor phase polymerizer further comprising:
  a gas discharge port adapted to discharge unreacted monomer gas, disposed at a top of the fluidized bed reactor,
  a gas recycling path connected to the gas discharge port and extending to a bottom of the fluidized bed reactor,
  a heat exchanger arranged upstream of the gas recycling path, and
  a gas circulator arranged downstream of the gas recycling path.

In this vapor phase polymerizer, it is preferred that the heat exchanger be a shell and tube heat exchanger in which tubes through which gas is passed for heat exchange are welded to tube plates provided for fixing the tubes to a shell of the heat exchanger, each welding portion being so formed that the tube has at its opening a front end positioned inside a tube plate surface and has at its opening a front end rounded. The employment of the above heat exchanger enables preventing the powder and mist contained in the recycling gas from remaining in tube plate parts to thereby avoid the trouble of clogging the heat exchanger and pipes.

The above gas circulator is preferred to be a blower of the structure described below. In the use of this blower, not only can the misty condensate of polymer powder containing monomer gas which has been formed by cooling by means of the heat exchanger pass through the blower without the generation of frictional force at the gas leakproof seal part clearance, slide part and rotational slide part but also the gas leakage can be prevented. Thus, the formation of stringy melt polymer resulting from heat buildup and melting of powder can be prevented and powder crushing, deformation and integration do not occur at the above clearance so that the trouble of clogging the distributor plate and gas recycling pipe of the polymerizer can be avoided. Further, even if the recycling gas contains mist generated in the heat exchanger, the employment of this blower enables circulation of the recycling gas without the need of removing the mist. Still further, the employment of this blower enables efficient polymerization without encountering the problems of device breaking, abnormal vibration, etc.

In a further aspect of the present invention, there is provided a blower for recycling a powder containing gas or for conducting a cyclone treatment thereof, which comprises:
  a blower body casing having therein a slide or rotational slide part between its discharge side as a high pressure side and its suction side as a low pressure side, the above slide or rotational slide part being provided with a noncontacted gas leakproof seal part at a clearance ranging from 0.7 to 2.5 mm.

In the blower of the present invention, the clearance of the gas leakproof seal part is preferred to range from 0.9 to 1.2 mm.

The type of blower is not particularly limited, and use can be made of turboblowers such as centrifugal and axial blowers and displacement blowers such as two-lobe (Roots) blower and other rotary blowers.

The noncontact-type gas leakproof seal part can appropriately be changed depending on the treatment to be effected and the type of the blower. Use can be made of noncontact-type seals such as labyrinth seal and carbon ring seal. In the use of two-lobe (Roots) blower as described below, the gas leakproof seal part can be created by regulating the clearance present between the periphery of each rotor and the inner wall of the casing and the clearance present between the rotors.

By virtue of the above structure, in the blower of the present invention, the gas leakproof seal part clearance enables powder to pass therethrough without generation of a frictional force and is sized so as to prevent gas leakage, so that the blower is free from the problems that powder suffers from heat buildup and melts into stringy melt polymer and that powder crushing, deformation and integration occur at the gas leakproof seal part clearance.

In particular, the blower of the present invention is preferred to be a turboblower having a gas leakproof seal part provided with labyrinth seal at a clearance ranging from 0.7 to 2.5 mm, especially, from 0.9 to 1.2 mm. The labyrinth seal is preferably arranged at a rotational slide part between an impeller connected to a principal shaft and a suction port.

Further, the blower of the present invention is preferred to be a Roots blower having a gas leakproof seal part composed of a clearance between a periphery of each rotor and an inner wall of a casing and a clearance between rotors, each of the clearances ranging from 0.7 to 2.5 mm, especially, from 0.9 to 1.2 mm.

DETAILED DESCRIPTION OF THE INVENTION

Figure 1:
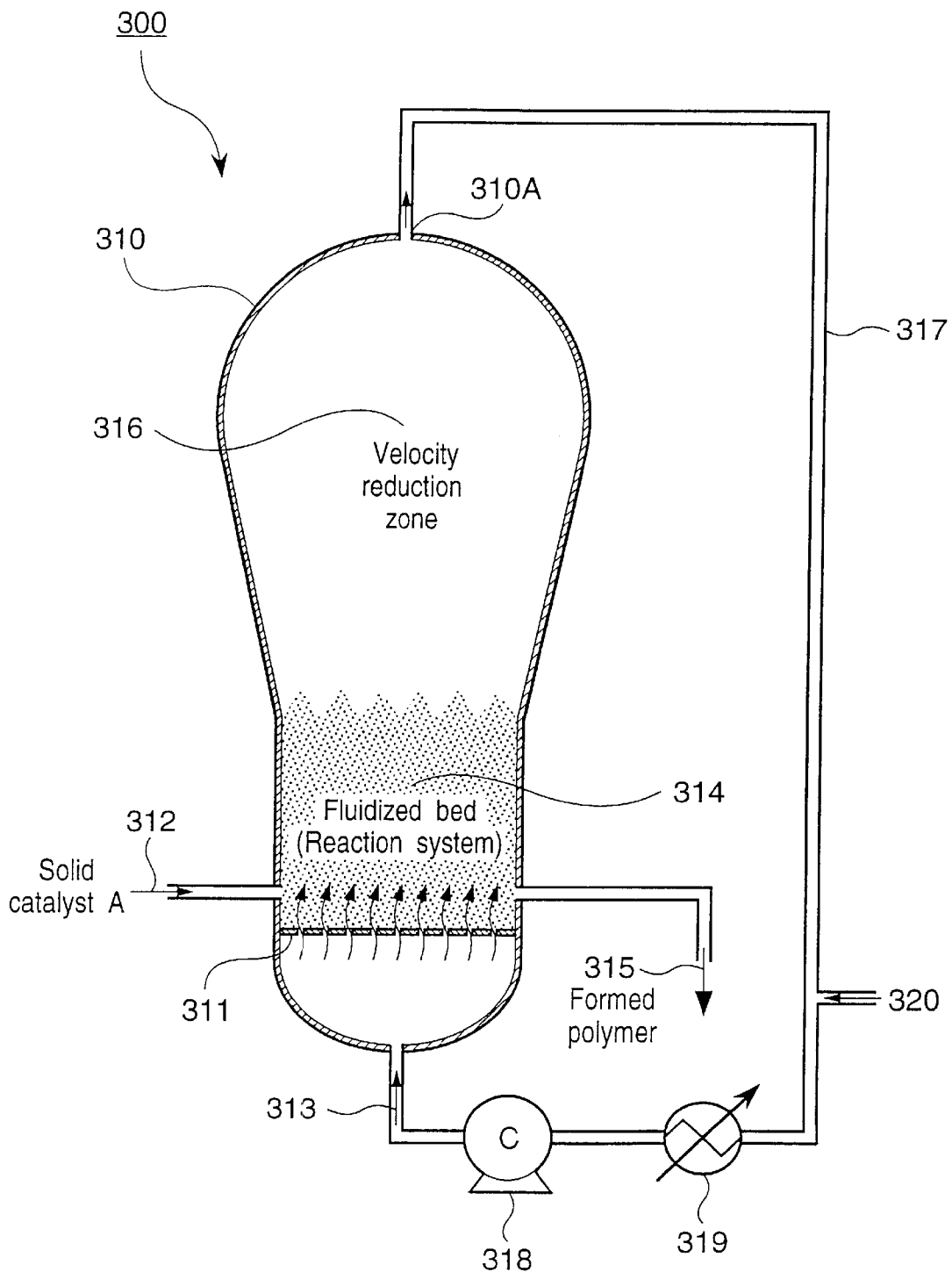
FIG. 1 is a schematic diagram of a first form of the vapor phase polymerizer of the present invention.

The method of vapor phase polymerization of the present invention, vapor phase polymerizer therefor and blower suitably employed in the above method of vapor phase polymerization and vapor phase polymerizer will now be described in detail with reference to the appended drawings.

In the present invention, the terminology "polymerization" may comprehensively mean not only homopolymerization but also copolymerization. Also, the terminology "polymer" may comprehensively mean not only homopolymer but also copolymer.

(1) Method of Vapor Phase Polymerization

The method of vapor phase polymerization according to the present invention comprises blowing a gaseous monomer from a bottom of a fluidized bed reactor through a distributor plate into the fluidized bed reactor by means of a blower while feeding a solid catalyst for polymerization into the fluidized bed reactor to thereby form a fluidized bed in the fluidized bed reactor and carrying out a vapor phase polymerization reaction in the fluidized bed to thereby produce a polymer or copolymer, in which method the blower has a slide or rotational slide part between its discharge side as a high pressure side and its suction side as a low pressure side in a blower body casing, the above slide or rotational slide part being provided with a noncontacted gas leakproof seal part at a clearance ranging from 0.7 to 2.5 mm.

In this vapor phase polymerization, it is preferred that the solid catalyst for polymerization be a solid catalyst for olefin polymerization, the gaseous monomer be a gaseous olefin monomer and an olefin polymer or copolymer be obtained by the vapor phase polymerization reaction in the fluidized bed.

Examples of olefins suitably employed in the present invention include α-olefins having 2 to 18 carbon atoms such as ethylene, propylene, 1-butene, 1-pentene, 1-hexene, 4-methyl-1-pentene, 1-octene and 1-decene and cycloolefins. These may be either homopolymerized or copolymerized.

Each of these olefins can be copolymerized with another polymerizable monomer, for example, a vinyl monomer such as styrene, vinyl chloride, vinyl acetate, vinyl acrylate, methyl (meth)acrylate, tetrafluoroethylene, vinyl ether or acrylonitrile, a conjugated diene such as butadiene or isoprene, a nonconjugated polyene such as 1,4-hexadiene, dicyclopentadiene or 5-vinyl-2-norbornene, an acetylene such as acetylene or methylacetylene or an aldehyde such as formaldehyde.

Although Ziegler titanium catalyst, Phillips chromium oxide catalyst and various other catalysts known as olefin polymerizing catalysts can be used as the solid catalyst in the present invention, it is preferred to conduct the vapor phase polymerization in the presence of a highly active metallocene catalyst.

The above preferred metallocene catalyst comprises:

a metallocene compound (A) of a transition metal selected from among metals of Group IVB of the periodic table, and at least one compound (B) selected from among:
an organoaluminum oxy compound (B-1),
an organoaluminum compound (B-2) and
a compound (B-3) capable of forming an ion pair by reacting with the metallocene compound (A).

Specifically, the above metallocene compound (A) is represented by the formula:

$$ML_x \tag{i}$$

wherein M is a transition metal selected from the group consisting of Zr, Ti, Hf, V, Nb, Ta and Cr; Ls are ligands joined to transition metal, at least one L being a ligand having cyclopentadienyl skeleton and L other than L which is a ligand having cyclopentadienyl skeleton being a hydrogen atom, a halogen atom, a hydrocarbon group having 1 to 12 carbon atoms, an alkoxy group, an aryloxy group, a trialkylsilyl group or a group of the formula $SO_3R$ (R is a hydrocarbon group having 1 to 8 carbon atoms, unsubstituted or substituted with, for example, a halogen); and x is the valence of transition metal.

Examples of suitable ligands having cyclopentadienyl skeleton include unsubstituted or alkyl substituted cyclopentadienyl groups such as cyclopentadienyl, methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylcyclopentadienyl groups, an indenyl group, a 4,5,6,7-tetrahydroindenyl group and a fluorenyl group. These groups may be substituted with, for example, a halogen atom or a trialkylsilyl group. Of these groups, alkyl substituted cyclopentadienyl groups are preferred.

With respect to the ligand other than one having cyclopentadienyl skeleton, the halogen is, for example, fluorine, chlorine, bromine and iodine; the hydrocarbon group having 1 to 12 carbon atoms is, for example, an alkyl group such as methyl, ethyl, propyl, isopropyl or butyl, a cycloalkyl group such as cyclopentyl or cyclohexyl, an aryl group such as phenyl or tolyl or an aralkyl group such as benzyl or neophyl; the alkoxy group is, for example, methoxy, ethoxy or butoxy; the aryloxy group is, for example, phenoxy; and the group of the formula $SO_3R$ is, for example, p-toluenesulfonate, methanesulfonate or trifluoromethanesulfonate.

When the compound represented by the above general formula (i) contains two or more cyclopentadienyl skeleton having groups, the two cyclopentadienyl skeleton having groups may be bonded together by an alkylene group such as ethylene or propylene, a substituted alkylene group such as isopropylidene or diphenylmethylene, a silylene group or a substituted silylene group such as dimethylsilylene, diphenylsilylene or methylphenylsilylene. These metallocene compounds (A) may be used in combination.

The organoaluminum oxy compound (B-1) may be either common benzene-soluble aluminoxane or benzene insoluble organoaluminum oxy compounds disclosed in Japanese Patent Laid-open Publication No. 2(1990)-78687.

The organoaluminum compound (B-2) is represented by, for example, the following general formula:

$$R^1_n AlX_{3-n} \tag{ii}$$

wherein $R^1$ is a hydrocarbon group having 1 to 12 carbon atoms, X is a halogen or hydrogen atom and n is 1 to 3.

In the general formula (ii), $R^1$ is a hydrocarbon group, for example, an alkyl, a cycloalkyl or an aryl group having 1 to 12 carbon atoms. Examples of suitable hydrocarbon groups include methyl, ethyl, n-propyl, isopropyl, isobutyl, pentyl, hexyl, octyl, cyclopentyl, cyclohexyl, phenyl and tolyl groups.

Also, the organoaluminum compound (B-2) may be represented by the following general formula:

$$R^1_n AlY_{3-n} \quad \text{(iii)}$$

wherein $R^1$ is as defined above in the formula (ii), n is 1–2 and Y is —$OR^2$, —$OSiR^3_3$, —$OAlR^4_2$, —$NR^5_2$, —$SiR^6_3$ or —$N(R^7)AlR^8_2$, in which each of $R^2$, $R^3$, $R^4$ and $R^8$ is, for example, methyl, ethyl, isopropyl, isobutyl, cyclohexyl or phenyl, $R^5$ is, for example, hydrogen, methyl, ethyl, isopropyl, phenyl or trimethylsilyl and each of $R^6$ and $R^7$ is methyl or ethyl.

The compound (B-3) capable of forming an ion pair by reacting with the metallocene compound (A) is, for example, selected from among Lewis acids, ionic compounds and carborane compounds described in National Publications of Japan, International Patent No. 1(1989)-501950 and No. 1(1989)-502036, and Japanese Patent Laid-open Publication Nos. 3(1991)-179005, 3(1991)-179006, 3(1991)-207703 and 3(1991)-207704 and EP-A-0468651.

Examples of suitable Lewis acids include triphenylboron, tris(4-fluorophenyl)boron, tris(p-tolyl)boron, tris(o-tolyl) boron, tris(3,5-dimethylphenyl)boron, tris (pentafluorophenyl)boron, $MgCl_2$, $Al_2O_3$ and $SiO_2$—$Al_2O_3$.

Examples of suitable ionic compounds include triphenylcarbenium tetrakis(pentafluorophenyl) borate, tri-n-butylammonium tetrakis(pentafluorophenyl) borate, N,N-dimethylanilinium tetrakis(pentafluorophenyl) borate and ferrocenium tetrakis(pentafluorophenyl) borate.

Examples of suitable carborane compounds include dodecaborane, 1-carbaundecaborane, bis-n-butylammonium (1-carbedodeca)borate, tri-n-butylammonium (7,8-dicarbaundeca)borate and tri-n-butylammonium (tridecahydride-7-carbaundeca)borate.

In the present invention, at least one compound selected from among the above components (B-1), (B-2) and (B-3), preferably, the above components (B-2) and (B-3) is used as cocatalyst component (B).

The above metallocene compound (A) and/or cocatalyst component (B) are/is generally contacted with a particulate support compound to thereby form a solid catalyst before use.

The support compound is generally in the form of a fine particulate or granular solid of 10 to 300 μm, preferably, 20 to 200 μm in particle or grain size. The support generally has a specific surface area of 50 to 1000 m²/g and is preferred to have a pore volume of 0.3 to 2.5 cm³/g.

Porous inorganic oxides are preferably used as the above support, examples of which include $SiO_2$, $Al_2O_3$, MgO, $ZrO_2$, $TiO_2$, $B_2O_3$, CaO, ZnO, BaO, $ThO_2$ and mixtures containing these such as $SiO_2/MgO$, $SiO_2/Al_2O_3$, $SiO_2/TiO_2$, $SiO_2/V_2O_5$, $SiO_2/Cr_2O_3$ and $SiO_2/TiO_2/MgO$. Of these, supports comprising $SiO_2$ and/or $Al_2O_3$ as principal components are especially preferred.

The above inorganic oxide may contain a small amount of carbonate, sulfate, nitrate and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$.

Also, an organic compound can be used as the catalyst support. For example, use can be made of (co)polymers produced from an α-olefin having 2 to 14 carbon atoms such as ethylene, propylene, 1-butene or 4-methyl-1-pentene as a main component and, further, polymers and copolymers produced from vinylcyclohexane or styrene as a main component.

The above catalyst components are generally contacted with the support at −50 to 150° C., preferably, −20 to 120° C. for 1 min to 50 hr, preferably, 10 min to 25 hr. This contact can be performed in an inert hydrocarbon solvent.

The thus prepared solid catalyst is preferred to have $5 \times 10^{-6}$ to $5 \times 10^{-4}$ gram atom, especially, $10^{-5}$ to $2 \times 10^{-4}$ gram atom, in terms of transition metal atom, of metallocene compound (A) and have $10^{-3}$ to $5 \times 10^{-2}$ gram atom, especially, $2 \times 10^{-3}$ to $2 \times 10^{-2}$ gram atom, in terms of aluminum or boron atom, of component (B) carried on each gram of support.

Although the thus prepared solid catalyst can directly be used in the polymerization in the present invention, an olefin prepolymerization can be conducted on the solid catalyst to thereby obtain a prepolymerization catalyst before use.

In the present invention, it is preferred that the solid catalyst or prepolymerization catalyst be used in an amount of 0.00001 to 1.0 mmol/hr, especially, 0.0001 to 0.1 mmol/hr, in terms of transition metal atom of the metallocene compound (A), per liter of polymerization volume.

When the prepolymerization catalyst is employed, the use of component (B) is discretionary. The component (B) can be used, according to necessity, in an amount of 5 to 300, preferably, from 10 to 200 and, still preferably, 15 to 150 in terms of the atomic ratio of aluminum or boron of the component (B) to transition metal of the polymerization system (ratio of Al or B/transition metal).

An olefin polymer can be produced with the use of the fluidized bed reactor shown in, for example, FIG. 1 according to the method of vapor phase polymerization of the present invention.

In the use of this fluidized bed reactor, a solid catalyst A is fed through a supply line 312 into a fluidized bed reactor 310 and, simultaneously, a gaseous monomer such as gaseous olefin is caused to pass through a supply line 313 and blown thereinto from a bottom of the fluidized bed reactor 310 through a gas distributor plate 311. The gas distributor plate 311 is composed of, for example, a porous plate which has a plurality of through holes, and is arranged in the vicinity of the bottom of the fluidized bed reactor 310. As a result, a fluidized bed (reaction system) 314 is formed and held in the fluid state in the fluidized bed reactor 310, whereby a polymerization reaction is carried out in the fluidized bed 314. The above gaseous olefin is continuously supplied through a supply line 320 which is combined with a recycling line 317.

Polymer particles produced by the polymerization reaction in the fluidized bed 314 are continuously discharged through a line 315 from the fluidized bed reactor 310. On the other hand, unreacted gaseous monomer having passed through the fluidized bed 314 has its flow rate reduced in a velocity reduction zone 316 provided in an upper part of the fluidized bed reactor 310 and is discharged outside the fluidized bed reactor 310 through a gas outlet 310A disposed at a top of the fluidized bed reactor 310.

It is preferred that the unreacted monomer having been discharged from the fluidized bed reactor 310 be deprived of the heat of polymerization reaction before being re-blown into the fluidized bed 314 of the fluidized bed reactor 310. Thus, it is preferred that the unreacted monomer be introduced in a heat exchanger (cooler) 319 disposed upstream of the recycling line 317 and cooled therein.

Such cooling may invite the problem that a condensate of, for example, olefin generated by the cooling by the cooler 319 is fed in misty form to gas recycling equipment such as blower to thereby clog gas recycling pipes or entrained to the distributor plate and gas recycling pipe of the polymerizer to thereby cause clogging and other serious trouble. Especially, when polymer particles are present together with the mist, wear and breakage are more serious than in the presence of polymer particles only in the use of common blower. In contrast, the below described blower of the present invention enables recycling the recycling gas without the need of removing any mist having been generated in the heat exchanger and mixed into the recycling gas and enables efficient polymerization which is free from the problems of apparatus breakage and abnormal vibration.

Naturally, a mist separator can be provided for capturing mist on, for example, the supply line 313.

The vapor phase polymerizer is so structured that the monomer gas having been cooled by the cooler 319 is caused to pass through the supply line 313 by means of the circulator such as blower 318 disposed downstream of the recycling line 317 and re-blown from the bottom of the fluidized bed reactor 310 through the gas distributor plate 311 into the fluidized bed 314 of the fluidized bed reactor 310.

Clogging and other trouble can be completely avoided by using the blower 318 as a blower, which has a slide or rotational slide part between its discharge side as a high pressure side and its suction side as a low pressure side in a blower body casing, the above slide or rotational slide part being provided with a noncontacted gas leakproof seal part at a clearance ranging from 0.7 to 2.5 mm, preferably, from 0.9 to 1.2 mm.

In the use of common cooler having no mist removing means mentioned above as the cooler 319, the employment of the below described blower of the present invention as the blower 318 realizes the advantage that not only can the powder contained in the recycling gas and mist pass through the gas leakproof seal part clearance, slide part and rotational slide part without the generation of frictional force but also the gas leakage can be prevented. Thus, the formation of stringy melt polymer resulting from heat buildup and melting of powder can be prevented and that powder crushing, deformation and integration do not occur at the above clearance so that the trouble of clogging the distributor plate and gas recycling pipe of the polymerizer can be avoided.

The gaseous monomer to be fed into the fluidized bed in the present invention may contain not only the above olefin such as ethylene but also an inert gas such as nitrogen. The fed gaseous monomer is generally blown into the fluidized bed at a linear velocity of about 0.4 to 1.5 m/sec, preferably, 0.6 to 1.2 m/sec.

Although varied depending on the type of olefin, copolymer composition and linear velocity of gaseous monomer, the polymerization is generally conducted at 50 to 120° C., preferably, 60 to 100° C. under a pressure of atmospheric pressure to 100 kg/cm$^2$, preferably, atmospheric pressure to 50 kg/cm$^2$.

The recycling gas supplied by the blower may contain condensable compounds, which may be monomers (principal monomer, comonomer or both thereof) to be polymerized or compounds inert to polymerization, such as propane or butane.

In the execution of the vapor phase polymerization, it is preferred that the recycling gas be cooled under conditions such that the condensable components are condensed because the heat of polymerization can efficiently be removed.

The latent heat of vaporization is extremely large as compared with the sensible heat, so that the quantity of heat removed per recycling gas is increased and that the efficiency of heat transfer is improved at the cooler.

The above condensable components comprise components which condense at temperatures ranging from 50° C. below the reaction temperature of vapor phase polymerization to the reaction temperature of vapor phase polymerization, preferably, from 30° C. below the reaction temperature of vapor phase polymerization to the reaction temperature of vapor phase polymerization.

The condensable components are generally contained in the gaseous monomer in an amount of at least several percents.

In the method of vapor phase polymerization according to the present invention, the gaseous monomer may be fed into the fluidized bed at temperatures lower than the reaction temperature of vapor phase polymerization in the fluidized bed.

The reaction temperature of vapor phase polymerization in the fluidized bed can be measured by customary methods, for example, by disposing a thermocouple in the reactor.

The vapor phase polymerization of the olefin may be performed by any of batch, continuous and semicontinuous processes.

In the present invention, a polyolefin can be obtained in granular form by the above vapor phase polymerization. The average grain diameter thereof is preferred to range from about 250 to 3000 $\mu$m, especially, from 400 to 1500 $\mu$m.

(2) Vapor Phase Polymerizer

The vapor phase polymerizer of the present invention will be described in detail below.

Figure 2:
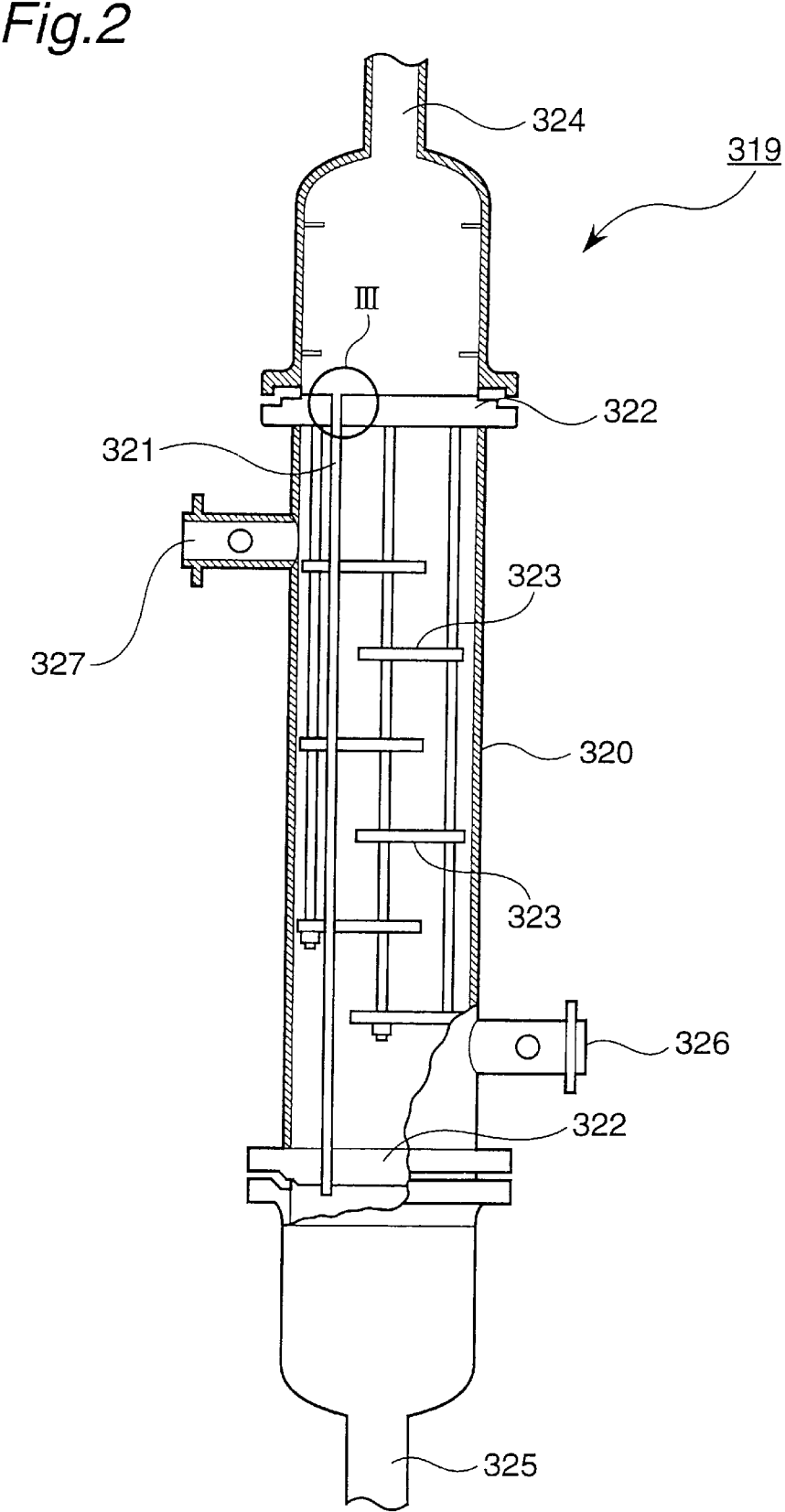
FIG. 2 is a longitudinal section of a cooler used in the vapor phase polymerizer of the present invention.
Figure 3:
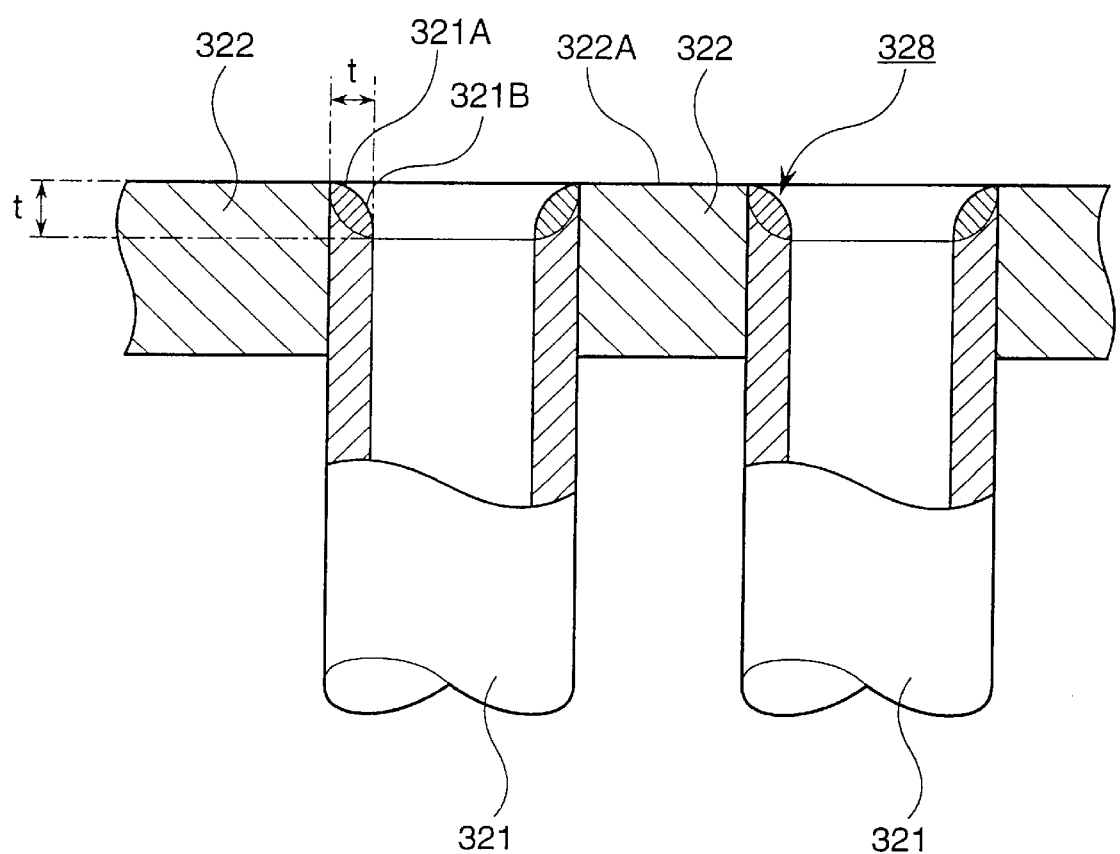
FIG. 3 is an enlarged section of part III of FIG. 2.

FIG. 1 is a schematic diagram of a first form of the vapor phase polymerizer of the present invention. FIG. 2 is a longitudinal section of a cooler used in the vapor phase polymerizer of the present invention. FIG. 3 is an enlarged section of part III of FIG. 2.

In the vapor phase polymerizer 300, a solid catalyst A is fed through a supply line 312 into a fluidized bed reactor 310 and, simultaneously, a gaseous monomer such as gaseous olefin is caused to pass through a supply line 313 and blown thereinto from a bottom of the fluidized bed reactor 310 through a gas distributor plate 311. The gas distributor plate 311 is composed of, for example, a porous plate which has a plurality of the through holes, and is arranged in the vicinity of the bottom of the fluidized bed reactor 310. Thus, a fluidized bed (reaction system) 314 is formed and held in the fluid state in the fluidized bed reactor 310, whereby a polymerization reaction is carried out in the fluidized bed 314. The above gaseous olefin is continuously supplied through a supply line 320 which is combined with a recycling line 317.

Polymer particles produced by the polymerization reaction in the fluidized bed 314 are continuously discharged through a line 315 from the fluidized bed reactor 310. On the other hand, unreacted gaseous monomer having passed through the fluidized bed 314 has its flow rate reduced in a velocity reduction zone 316 provided in an upper part of the fluidized bed reactor 310 and is discharged outside the fluidized bed reactor 310 through a gas outlet 310A disposed at a top of the fluidized bed reactor 310.

The unreacted monomer having been discharged from the fluidized bed reactor 310 has to be deprived of the heat of polymerization (i.e., heat generated by the polymerization reaction) before being re-blown into the fluidized bed 314 of the fluidized bed reactor 310, so that the unreacted monomer is introduced in a heat exchanger (cooler) 319 disposed upstream of the recycling line 317 and cooled therein.

Referring to FIG. 2, the employed heat exchanger 319 is a shell and tube heat exchanger comprising a cylindrical shell 320 and, provided therein, a plurality of tubes 321 arranged in the lengthwise direction of the shell, through which the recycling gas is passed for effecting a heat exchange with a refrigerant, and baffles 323 arranged for causing the refrigerant to flow along the periphery of each tube 321. In FIG. 2, numeral 324 denotes a recycling gas inlet, numeral 325 a recycling gas outlet, numeral 326 a refrigerant inlet and numeral 327 a refrigerant outlet.

In the heat exchanger 319, it is preferred that, referring to FIG. 3 showing an enlarged section, the above tubes 321 be welded to tube plates 322, each welding portion 328 being so formed that the tube has at its opening portion a front end 321A positioned inside a tube plate surface 322A and has at its opening portion a front end 321B rounded, namely, provided with a radius (R). The employment of the above heat exchanger 319 enables preventing the powder and mist contained in the recycling gas from remaining in tube plate parts in the vicinity of tube openings to thereby avoid the trouble of clogging the heat exchanger and pipes.

In this connection, the heat exchange may invite the problem that a condensate of, for example, olefin generated by the cooling by the cooler 319 is fed in misty form to gas recycling equipment such as blower to thereby clog gas recycling pipes or entrained to the distributor plate and gas recycling pipe of the polymerizer to thereby cause clogging and other serious trouble. Especially, when polymer particles are present together with the mist, wear and breakage are more serious than in the presence of polymer particles only in the use of common blower. In contrast, the below described blower of the present invention enables recycling the recycling gas without the need of removing any mist having been generated in the heat exchanger and mixed into the recycling gas and enables efficient polymerization which is free from the problems of apparatus breakage and abnormal vibration.

Naturally, a mist separator can be provided for capturing mist on, for example, the supply line 313.

The vapor phase polymerizer is so structured that the monomer gas having been cooled by the cooler 319 is caused to pass through the supply line 313 by means of the circulator such as blower 318 disposed downstream of the recycling line 317 and re-blown from the bottom of the fluidized bed reactor 310 through the gas distributor plate 311 into the fluidized bed 314 of the fluidized bed reactor 310.

Although common blower can be used as the blower 318, the use of the below described blower of the present invention is advantageous in that clogging and other trouble can be completely avoided. In the use of common cooler having no mist removing means mentioned above as the cooler 319, the employment of the blower of the present invention as the blower 318 realizes the advantage that not only can the powder contained in the recycling gas and mist pass through the gas leakproof seal part clearance, slide part and rotational slide part without the generation of frictional force but also the gas leakage can be prevented. Thus, the formation of stringy melt polymer resulting from heat buildup and melting of powder can be prevented and powder crushing, deformation and integration do not occur at the above clearance so that the trouble of clogging the distributor plate and gas recycling pipe of the polymerizer can be avoided.

(3) Blower

The blower of the present invention will be described in detail below.

Figure 6:
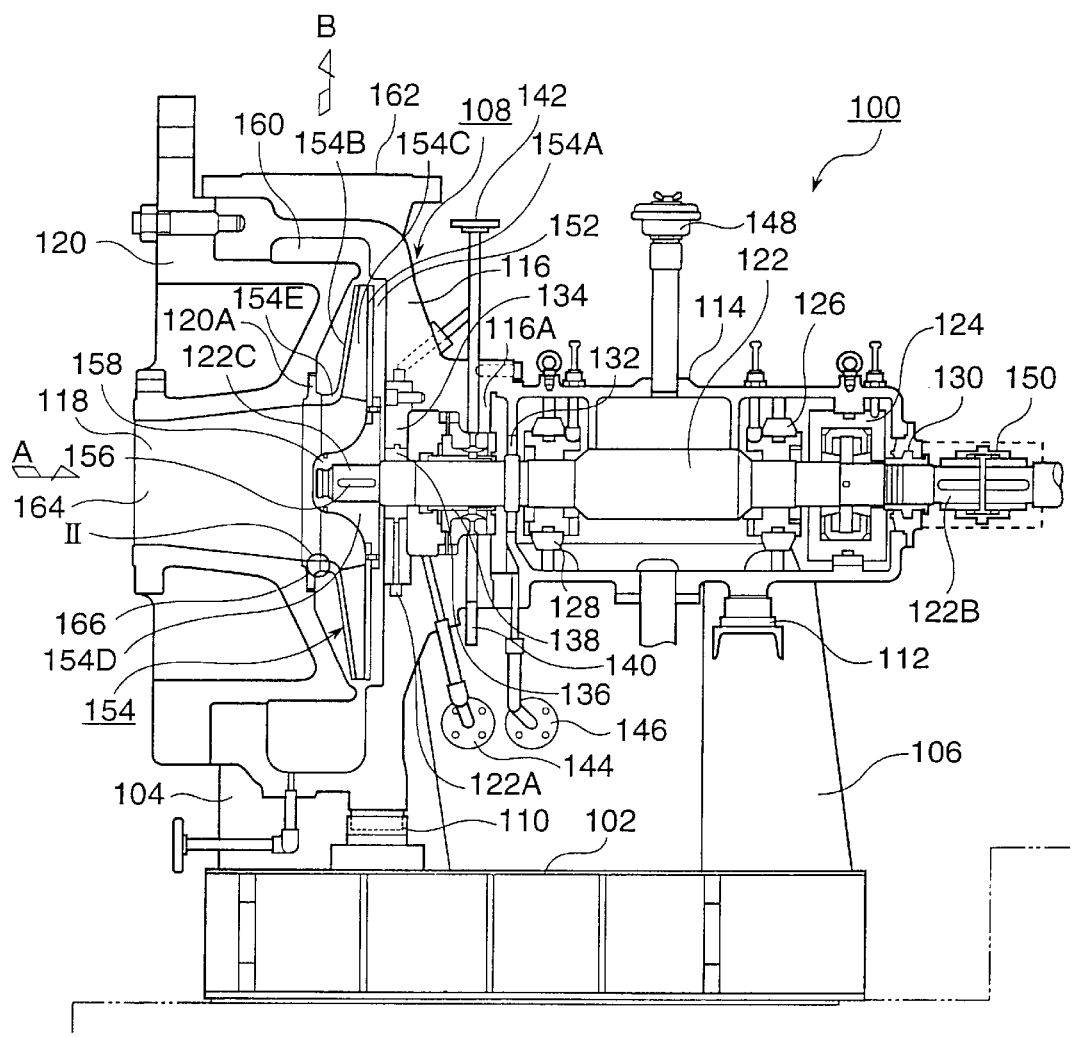
FIG. 6 is a longitudinal section showing a first embodiment in which the blower of the present invention has been employed in a turboblower.
Figure 7:
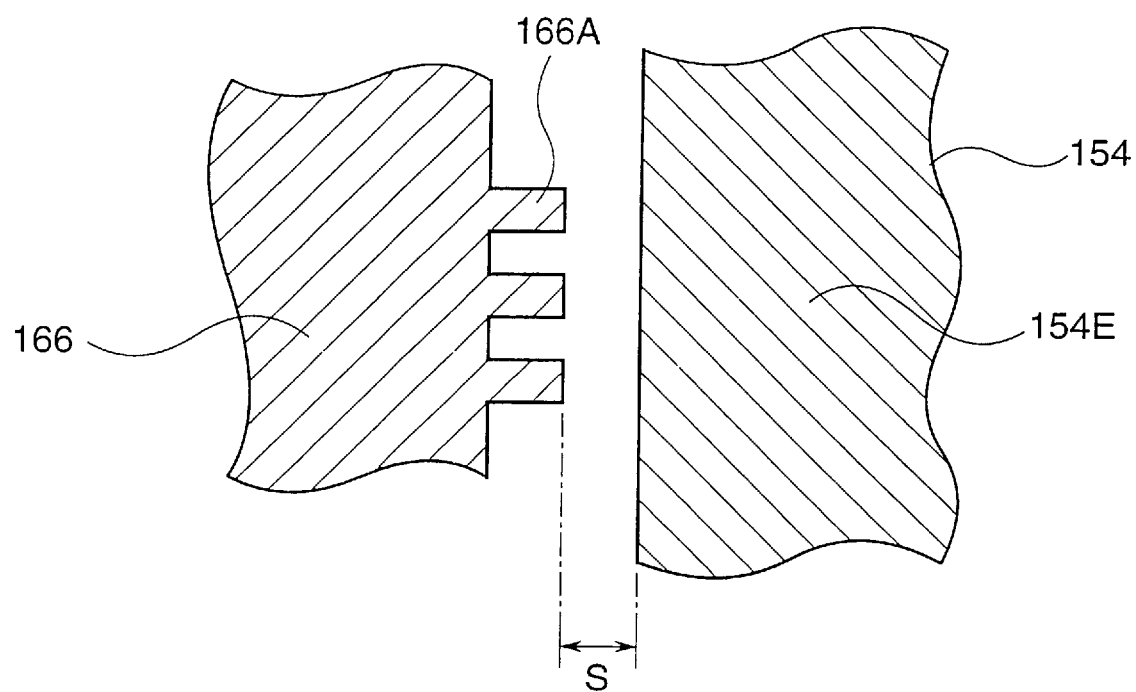
FIG. 7 is an enlarged section of part II of FIG. 6.

FIG. 6 is a longitudinal section showing a first embodiment in which the blower of the present invention has been employed in a turboblower. FIG. 7 is an enlarged section of part II of FIG. 6.

Referring to FIG. 6, the blower of the present invention generally designated 100 comprises a blower base 102 placed on, for example, a floor surface and, fixed thereon by flanges 104, 106, a blower body 108. Numerals 110, 112 denote bracing cotters for preventing the resonance and vibration of the blower body 108. The blower body 108 includes a substantially cylindrical bearing casing 114, a discharge casing 116 connected to the bearing casing 114 and a suction casing 120 connected to the discharge casing 116, the above suction casing 120 being provided with a suction port 118.

A principal shaft 122 as a driving shaft is rotatably fitted inside the bearing casing 114 by a thrust bearing 124, bearing metals 126, 128 and bearing glands 130, 132, 134. A gland labyrinth 136 is inserted between a shaft sleeve 122A of the principal shaft 122 and the bearing gland 134 and a mechanical seal 138 is provided between the shaft sleeve 122A and a flange part 116A of the discharge casing 116 so that the sealing is ensured to thereby prevent, for example, lubricant applied on the side of the principal shaft 122 from mixing into the treated gas and also prevent, contrarily, the treated gas from entering the side of the principal shaft 122, namely, the inside of the bearing casing 114. Numeral 140 denotes a mechanical seal oil feeding port, numeral 142 a mechanical seal oil discharging port, numerals 144, 146 mechanical seal drains and numeral 148 an air vent.

An end 122B (right side of FIG. 6) of the principal shaft 122 is connected by a gear coupling 150 to a driving shaft of a motor (not shown), so that the principal shaft 122 is rotated. A principal impeller 154 is disposed in a space for impeller rotation 152 provided between the discharge casing 116 and an inner wall of the suction casing 120. The principal impeller 154, at its hub 154D, is fixed by an impeller 156 and an impeller nut 158 to the other end 122C of the principal shaft, so that the principal impeller 154 is rotated together with the principal shaft 122.

The impeller 154 includes a main plate 154A, a side plate 154B and a vane 154C. When the impeller 154 is rotated at a high speed, the gas is suctioned in the direction of arrow A from the suction port 118 of the suction casing 120 and the gas passing through the blower is centrifuged by the action of the vane to thereby have its speed and pressure increased. The gas having its speed and pressure increased passes through a high pressure chamber 160 formed between the suction casing 120 and an inner wall of the discharge casing 116 and is discharged in the direction of arrow B from a discharge port 162 of the discharge casing 116 which communicates with the high pressure chamber 160.

The rotational slide part between a front end 154E of the side plate 154B of the impeller 154 and an inner edge portion 120A of the suction port of the suction casing 120 is provided with a labyrinth seal ring 166 as a gas leakproof seal part so as to prevent gas leakage (gas edge cutting) between the high pressure chamber 160 on the discharge side being the high pressure side and a suction space 164 formed at the suction port of the suction casing 120 on the suction side being the low pressure side.

In this embodiment, as shown in the enlarged view of FIG. 7, the clearance S between a protrudent part 166A of the labyrinth seal ring 166 and the front end 154E of the side plate 154B of the impeller 154 ranges from 0.7 to 2.5 mm, preferably, from 0.9 to 1.2 mm. This range of clearance enables powder contained in the gas treated by the blower to pass therethrough without generation of a frictional force and is sized so as to prevent gas leakage. Thus, the blower is free from the problems that powder suffers from heat buildup and melts into stringy melt polymer and that powder crushing, deformation and integration occur at the gas leakproof seal part clearance.

Figure 4:
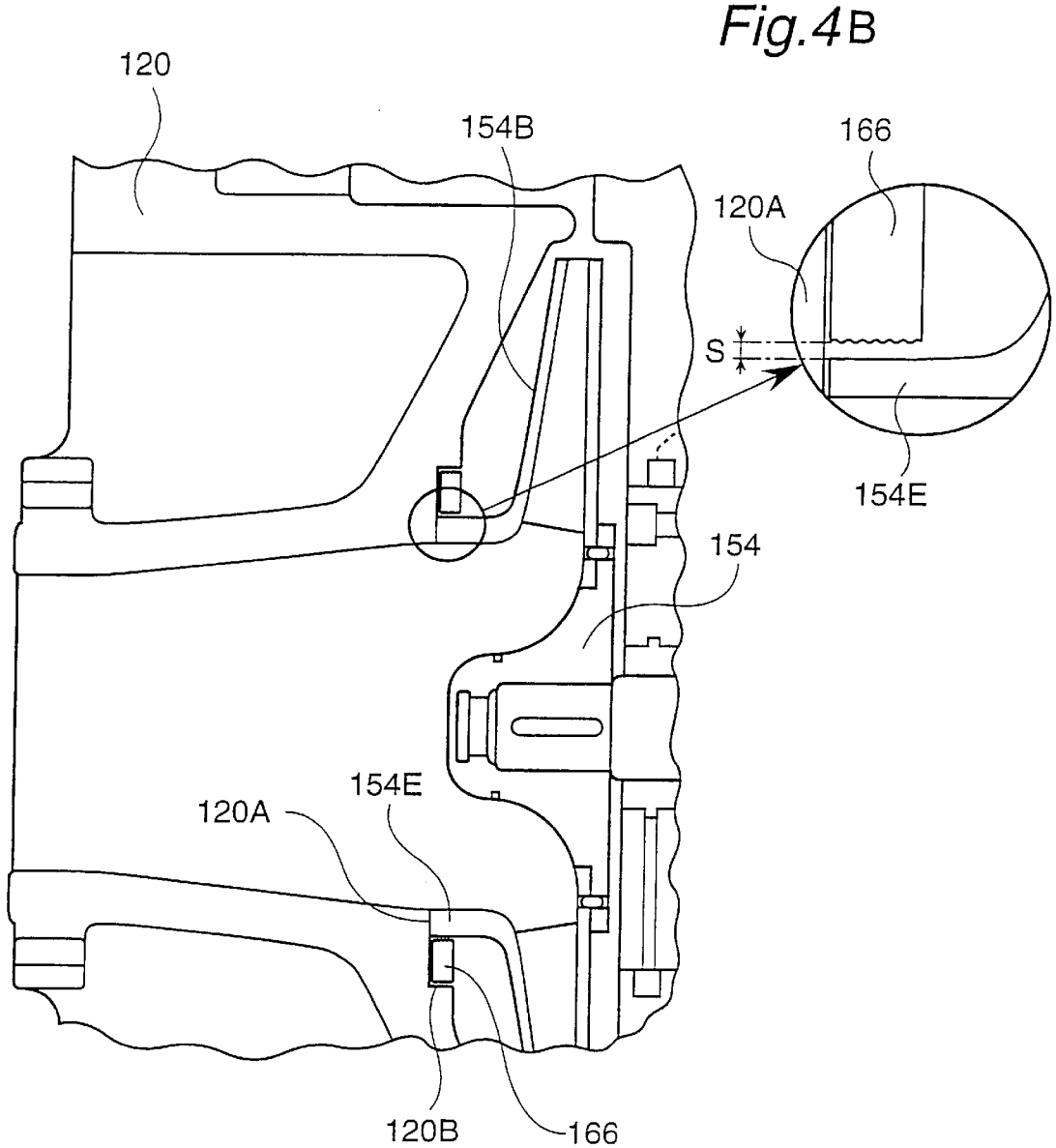
FIG. 4A is a partial longitudinal section showing another arrangement of a labyrinth seal in the blower of the present invention and FIG. 4B is an enlarged portion of FIG. 4A.
Figure 5:
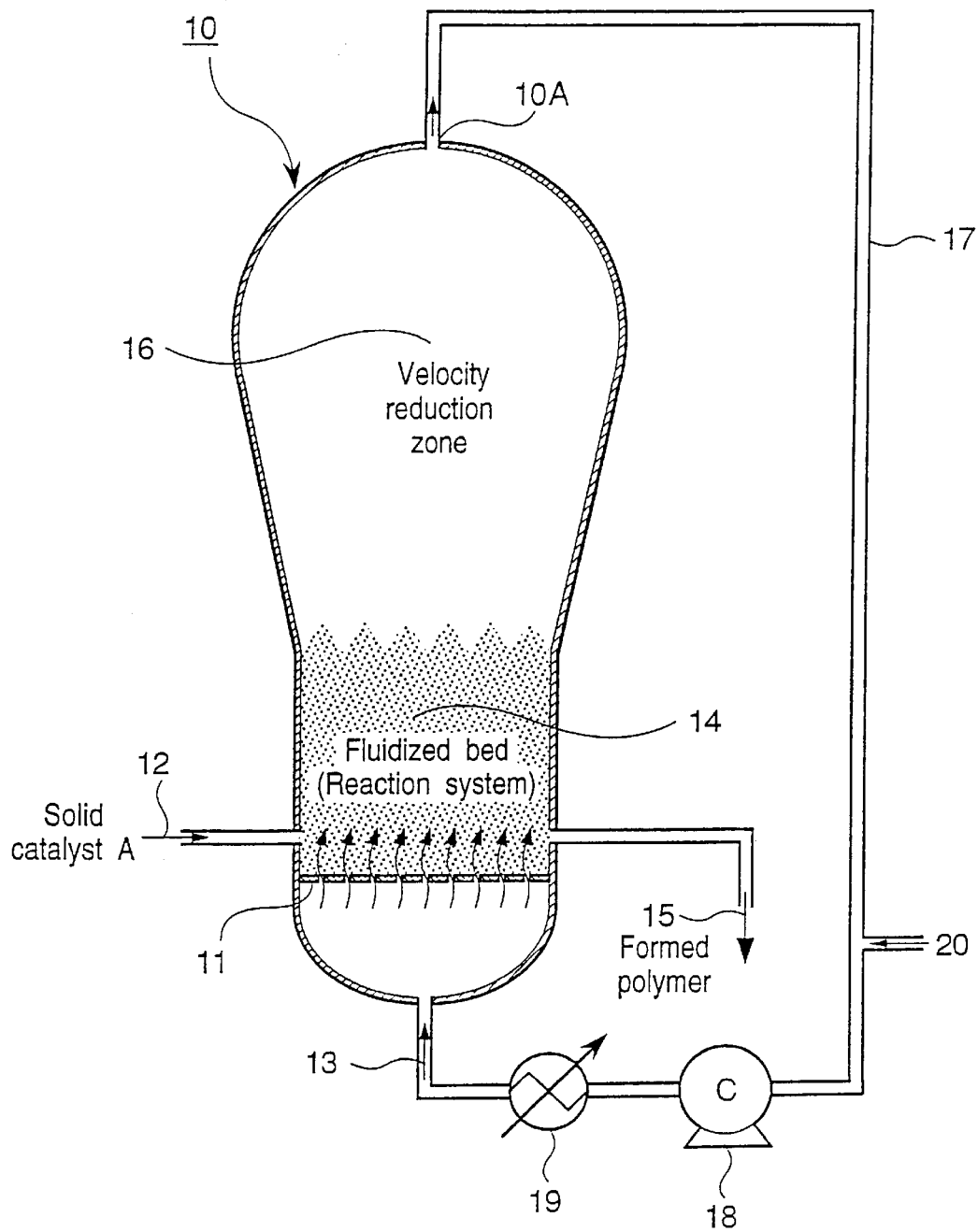
FIG. 5 is a schematic diagram of the conventional vapor phase polymerizer.

Although the labyrinth seal ring 166 is interposed between the front end 154E of the side plate 154B of the impeller 154 and the inner edge portion 120A of the suction port of the suction casing 120 in this embodiment, this labyrinth seal ring 166 may be fitted in a recess part 120B of the inner edge portion 120A of the suction port of the suction casing 120 to thereby create a seal part of seal clearance S between the same and the periphery of the front end 154E of the side plate 154B of the impeller 154 as shown in FIG. 4.

Figure 8:
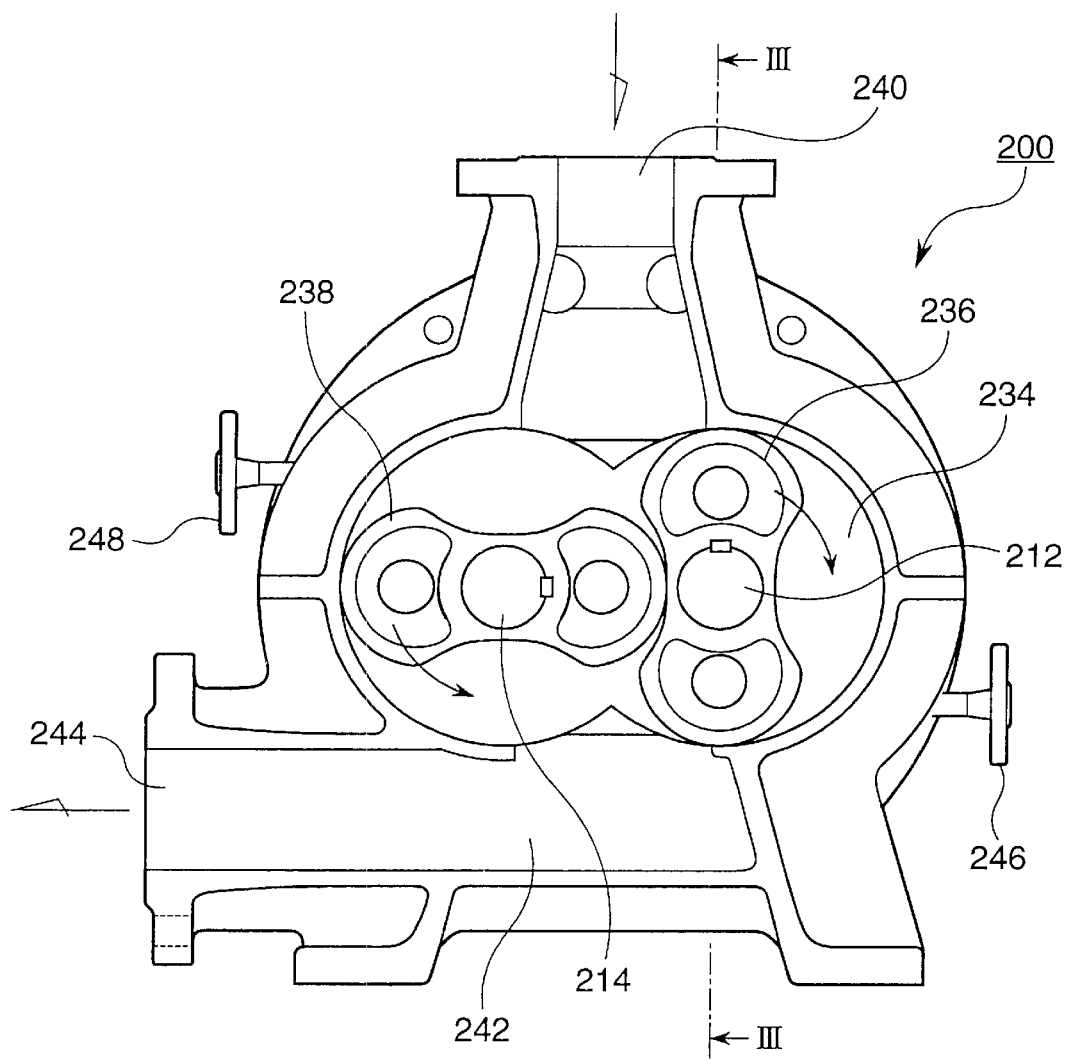
FIG. 8 is a longitudinal section showing a second embodiment in which the blower of the present invention has been employed in a Roots blower.
Figure 9:
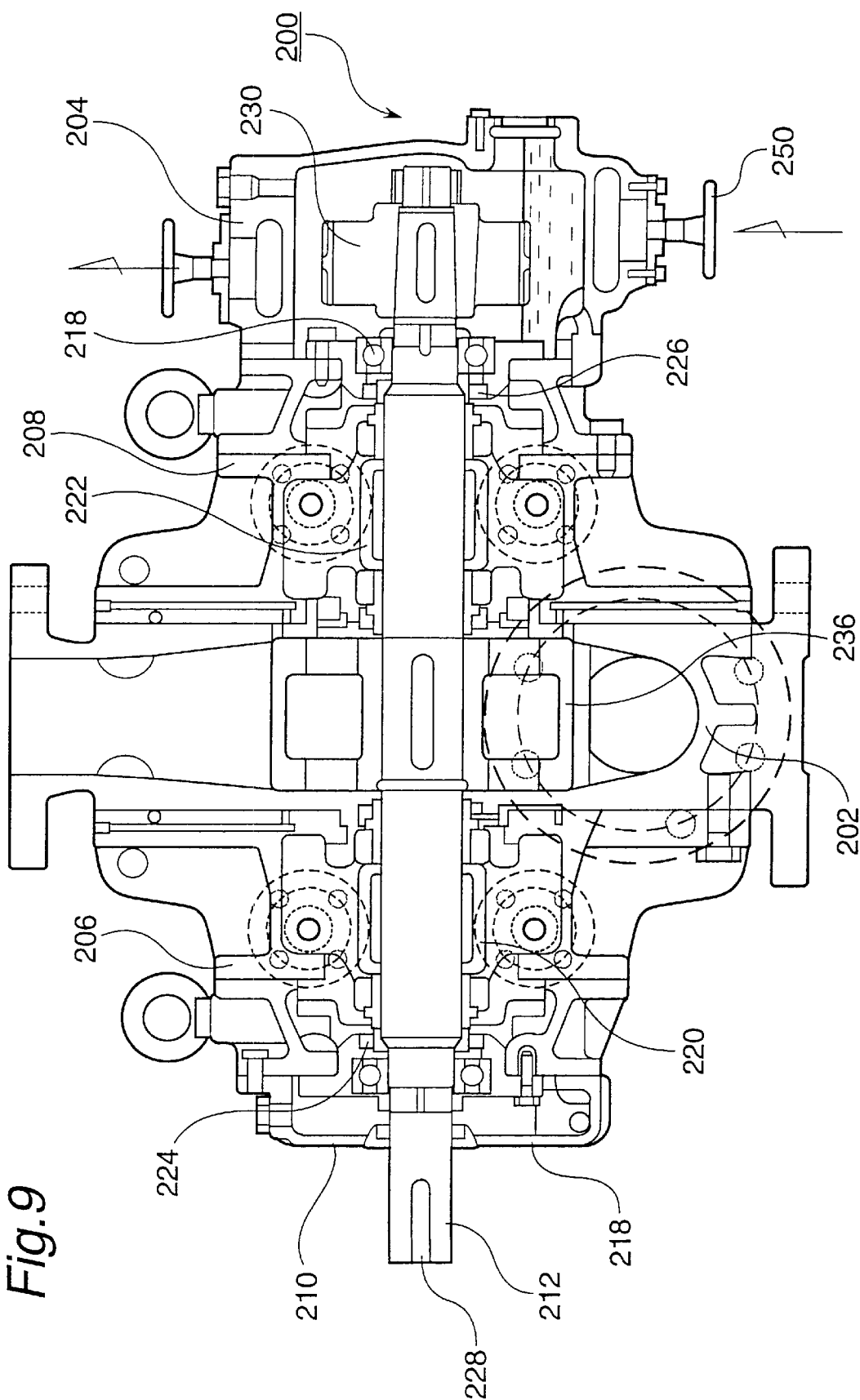
FIG. 9 is a longitudinal section on the line III—III of FIG. 8.

FIG. 8 is a longitudinal section showing a second embodiment in which the blower of the present invention has been employed in a Roots blower. FIG. 9 is a longitudinal section on the line III—III of FIG. 8.

Referring to FIGS. 8 and 9, the blower of the present invention generally designated 200 comprises a casing body 202, a gear case 204, side covers 206, 208 and a bearing cover 210, through which a driving shaft 212 and a driven shaft 214 horizontally arranged with a spacing therebetween extend. The driving shaft 212 and driven shaft 214 are rotatably mounted on the blower.

The driving shaft 212 is rotatably mounted by means of bearings 216, 218 disposed in the side covers 206, 208 and is provided with mechanical seals 220, 222 and oil seals 224, 226. The driving shaft 212 is so structured as to prevent, for example, lubricating oil applied to the rotating part of the driving shaft 212 from mixing into the treated gas and to prevent, contrarily, the treated gas from entering the rotating part of the driving shaft 212. These structural features also apply to the driven shaft 214.

Figure 11:
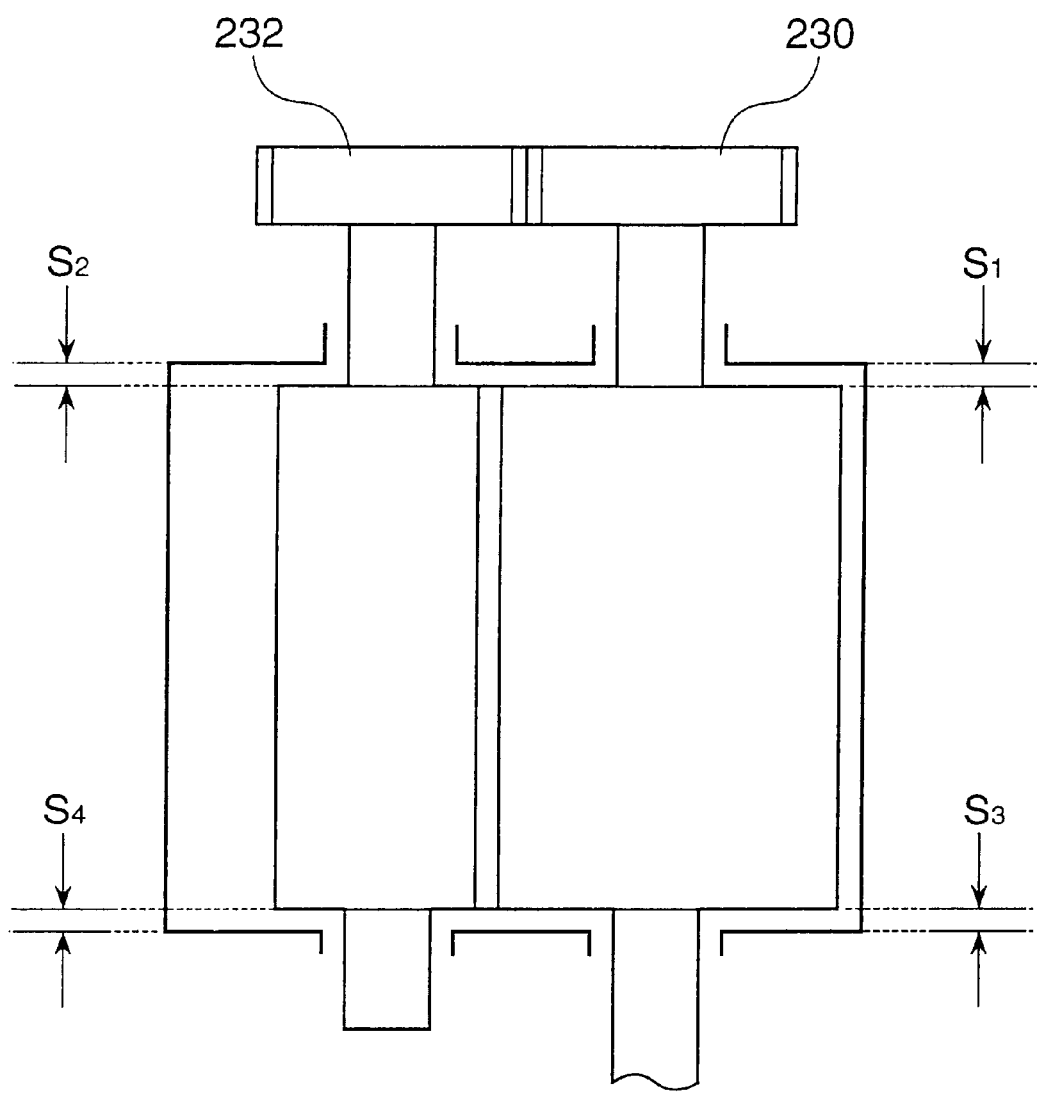
FIG. 11 is another schematic diagram explaining the clearance at rotor rotation in the second form of the blower of the present invention.

An end (left side of FIG. 9) of the driving shaft 212 is protrudent from the bearing cover 210 and is connected by a coupling 228 to, for example, a driving shaft of a motor (not shown) so that the driving shaft 212 is rotated. On the other hand, the other end (right side of FIG. 9) of the driving shaft 212 is protrudent into the gear case 204 and has a driving gear 230 secured thereto. Referring to FIG. 11, a driven gear 232 which interlocks with the driving gear 230 is secured to the driven shaft 214. Thus, the driven shaft 214 is rotated synchronously with the driving shaft 212 in directions opposite to each other, so that two-lobe rotors 236, 238 secured to the driving shaft 212 and driven shaft 214, respectively, are rotated in directions opposite to each other (arrowed directions in FIG. 8) with a phase shift in a blower chamber 234 provided in the casing body 202. Consequently, the gas is blown under pressure.

The casing body 202 is provided at its upper end with a suction port 240 communicating with the blower 234 and provided at its lower end with a discharge path 242 and discharge port 244 which communicate with the blower chamber 234. Numeral 246 denotes a seal liquid inlet nozzle, numeral 248 a seal liquid outlet nozzle and numeral 250 a coolant inlet and outlet nozzle.

Figure 10:
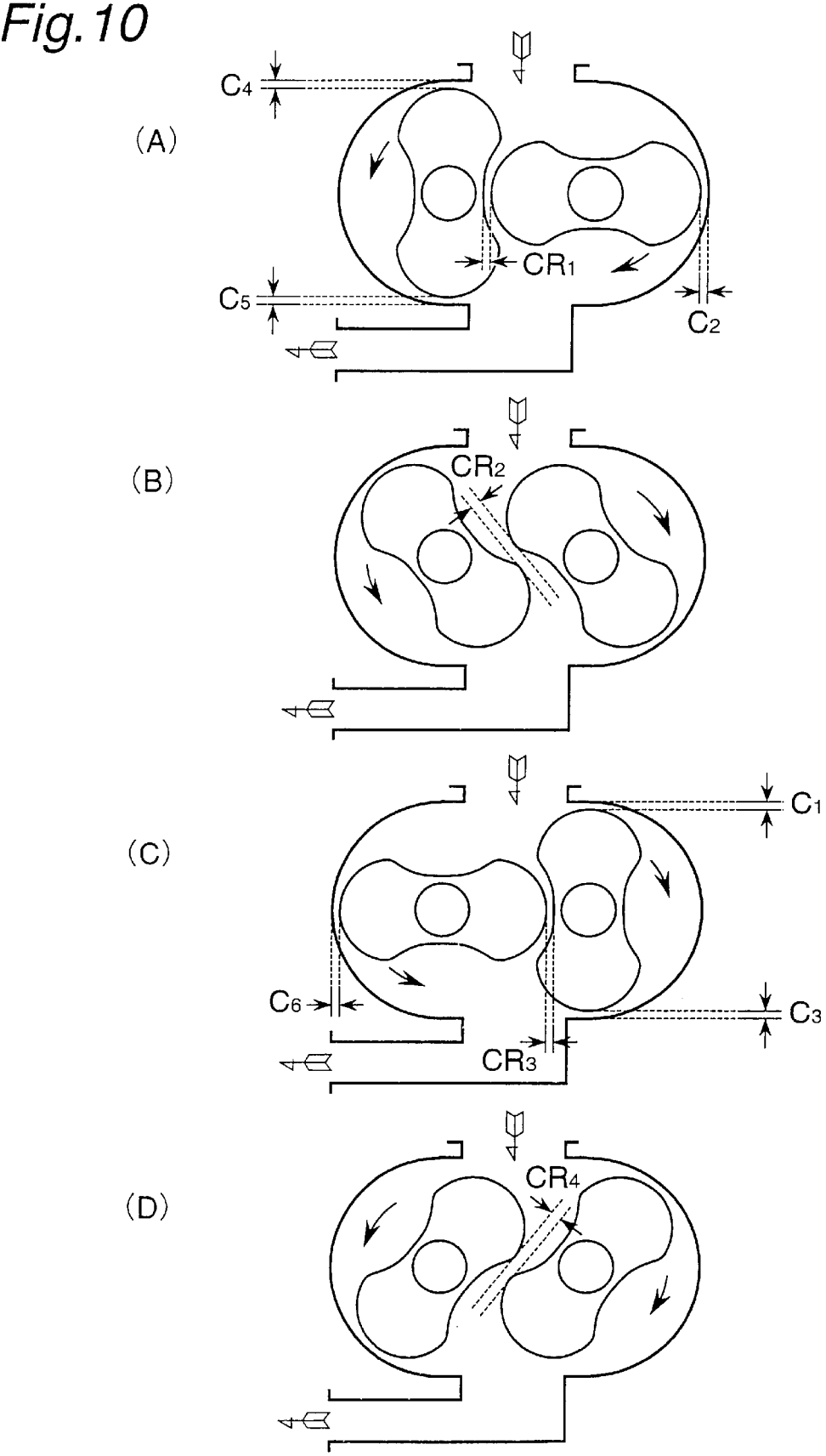
FIG. 10 is a schematic diagram explaining the clearance at rotor rotation in a second form of the blower of the present invention.

In this embodiment, in the rotation of the rotors 236, 238, each of the clearances CR1 to CR4 between the rotors 236, 238 and clearances C1 to C6 and S1 to S4 (side clearances) between the periphery of the rotors 236, 238 and the inner wall of the blower chamber 234 provided in the casing body 202 as shown in FIG. 10 (A) to (D) and FIG. 11 which function as gas leakproof seal parts ranges from 0.7 to 2.5 mm, preferably, 0.9 to 1.2 mm. This range of clearance enables powder contained in the gas treated by the blower to pass therethrough without generation of a frictional force and is sized so as to prevent gas leakage. Thus, the blower is free from the problems that powder suffers from heat buildup and melts into stringy melt polymer and that powder crushing, deformation and integration occur at the gas leakproof seal part clearance.

EFFECT OF THE INVENTION

In the method of vapor phase polymerization of the present invention, not only is safe production ensured without the problems that a condensate of, for example, olefin containing polymer powder which has been generated by cooling by the cooler as heat exchanger assumes misty form to thereby clog a gas recycling pipe and that such mist is entrained to the distributor plate and gas recycling pipe of the polymerizer to thereby cause clogging and other serious trouble but also the recycling equipment per se becomes compact to thereby enable reducing production cost.

In the vapor phase polymerizer of the present invention a heat exchanger and a gas circulator are arranged upstream and downstream of a gas recycling path, respectively, and the blower of the present invention is employed in passing the recycling gas such as unreacted gaseous olefin having been discharged from a fluidized bed reactor through a heat exchanger (cooler) prior to the re-blowing into the fluidized bed of the fluidized bed reactor because of the need of depriving the recycling gas of heat of polymerization (i.e., heat generated by the polymerization reaction). This constitution is advantageous in being free from the problems that a condensate of, for example, olefin containing polymer powder which has been generated by cooling by the cooler assumes misty form to thereby clog a gas recycling pipe and that such mist is entrained to the distributor plate and gas recycling pipe of the polymerizer to thereby cause clogging and other serious trouble, the above polymerizer thus allowing the recycling equipment per se to be compact.

In the vapor phase polymerizer of the present invention, the employment of, as the heat exchanger, a shell and tube heat exchanger in which tubes through which gas is passed for heat exchange are welded to tube plates provided for fixing the tubes to a shell of the heat exchanger, each welding portion being so formed that the tube has at its opening a front end positioned inside a tube plate surface and has at its opening a front end rounded. This constitution enables preventing the powder and mist contained in the recycling gas from remaining in tube plate parts in the vicinity of tube openings to thereby avoid the trouble of clogging the heat exchanger and pipes.

In the blower of the present invention, the blower body casing has therein a slide or rotational slide part between its discharge side as a high pressure side and its suction side as a low pressure side, the above slide or rotational slide part being provided with a noncontacted gas leakproof seal part such as labyrinth seal or rotor-to-rotor clearance at a clearance ranging from 0.7 to 2.5 mm, preferably, from 0.9 to 1.2 mm. Therefore, (1) the gas leakproof seal part clearance enables powder to pass therethrough without generation of a frictional force and is sized so as to prevent gas leakage, so that the blower is free from the problems that powder suffers from heat buildup and melts into stringy melt polymer and that powder crushing, deformation and integration occur at the gas leakproof seal part clearance;

(2) neither is the step of removing fine powder needed in the after treatment nor the gas recycling pipe is clogged; and (3) no stringy melt polymer is formed, so that there is no entrainment thereof to the distributor plate and gas recycling pipe of the polymerizer to thereby be free from clogging and other serious trouble.

EXAMPLE

The present invention will now be illustrated in greater detail with reference to the following Examples, which in no way limit the scope of the invention.

Example 1 and Comparative Examples 1–2

One embodiment of the present invention, Example 1, was carried out with the use of polypropylene powder A of the composition specified in the following Table 1 by operating the Roots blower of FIGS. 8 and 9 according to the present invention under operating conditions specified in Table 2. In contrast, the same test was conducted by operating a Roots blower with the same structure as that of the Roots blower of FIGS. 8 and 9 according to the present invention except that it had the common clearance specified in Table 2 under operating conditions specified in Table 2, thereby obtaining the results shown in the columns "Comparative Examples 1 and 2".

TABLE 1

| Composition of Polypropylene as Powder A | |
|---|---|
| MFR | 22.0 |
| ethylene/propylene content wt. % | 8.0 |
| av. particle size | 700 μm |
| particle size distribution | |
| –20 mesh | 32.3 wt. % |
| 20–32 mesh | 65.3 |
| 32–42 mesh | 2.2 |
| 42–60 mesh | 0.2 |
| 60–80 mesh | 0 |
| 80–150 mesh | 0 |
| 150– mesh | 0 | polyethylene (LLDPE) powder B of the composition specified in the following Table 3 by operating the turboblower of FIG. 6 according to the present invention under operating conditions specified in Table 4. In contrast, the same test was conducted by operating a turboblower with the same structure as that of the turboblower of FIG. 6 according to the present invention except that it had the common labyrinth clearance specified in Table 4 under operating conditions specified in Table 4, thereby obtaining the results shown in the columns "Comparative Examples 3 and 4".

TABLE 3

| Composition of Linear Low-density Polyethylene | |
|---|---|
| (LLDPE) as Powder B | |
| MFR | 4.0 |
| density | 0.920 |
| av. particle size | 1200 μm |
| particle size distribution | |
| over 1680 mesh | 11.89 wt. % |
| 840–1680 mesh | 55.08 |
| 350–840 mesh | 30.9 |
| 250–350 mesh | 1.62 |
| 177–250 mesh | 0.37 |
| up to 177 mesh | 0.13 |

TABLE 2

| | Type of blower | Clearance | | | Powder used | Powder concn. of gas (kg/m$^3$) | Gas qty. (m$^3$/min) | Power consumed (KwH) | Operation time (min) | Occurrence of stringy polymer |
|---|---|---|---|---|---|---|---|---|---|---|
| | | rotor/ casing (mm) | rotor/ rotor (mm) | side (mm) | | | | | | |
| Example 1 | Roots improved | 0.85–0.93 | 0.85–0.88 | 0.97–1.0 | powder A | 3.0 | 42.5 | 32.1 | 30 | no occurrence of stringy polymer |
| Comp. Ex. 1 | Roots standard | 0.2–0.4 | 0.42–0.47 | 0.2–0.4 | powder A | 1.0 | 42.5 | 30.7 | 30 | ten 5–20 mm polymer strings found |
| Comp. Ex. 2 | Roots standard | 0.2–0.4 | 0.42–0.47 | 0.2–0.4 | powder A | 3.0 | 42.5 | 30.5 | 30 | twenty to thirty 5–30 mm polymer strings found |

Examples 2–5 and Comparative Examples 3–4

Other embodiments of the present invention, Examples 2 to 5, were carried out with the use of linear low-density

TABLE 4

|  | Type of blower | Labyrinth clearance (mm) | Powder used | Powder concn. of gas (kg/m³) | Gas qty. (m³/min) | Power consumed (KwH) | Operation time (min) | Occurrence of stringy polymer |
|---|---|---|---|---|---|---|---|---|
| Example 2 | turbo improved 1 | 0.75 | powder B | 3.0 | 30 | 16.1 | 30 | small amt. of up to 5 mm stringy polymer found. |
| Example 3 | turbo improved 2 | 1.0 | powder B | 3.0 | 30 | 16.5 | 30 | no occurrence of stringy polymer. |
| Example 4 | turbo improved 3 | 2.0 | powder B | 3.0 | 30 | 18.2 | 30 | no occurrence of stringy polymer but blower efficiency deteriorated. |
| Example 5 | turbo improved 4 | 3.0 | powder B | 3.0 | 30 | 20.7 | 30 | no occurrence of stringy polymer but blower efficiency extremely deteriorated. |
| Comp. Ex. 3 | turbo standard | 0.5 | powder B | 1.0 | 30 | 15.5 | 30 | five 5–10 mm polymer strings found. |
| Comp. Ex. 4 | turbo standard | 0.5 | powder B | 3.0 | 30 | 15.7 | 30 | ten 5–10 mm polymer strings found. |

As apparent from the results of Tables 2 and 4, the Roots and turbo blowers having the common clearance (Comparative Examples 1 to 4) suffer from the occurrence of stringy polymer, thus, suffers from the entrainment thereof to the distributor plate and gas recycling pipe of the polymerizer to thereby cause clogging and other serious trouble. By contrast, the occurrence of stringy polymer is suppressed in Examples 1 to 5 according to the present invention, thereby showing the advantage of clearance ranging from 0.7 to 2.5 mm. Taking the blower efficiency into account, it is found that the clearance of Examples 1 to 3 ranging from 0.9 to 1.2 mm is preferred.

Example 6

The fluidized bed reactor 310 of FIG. 1 was employed in which the fluidized bed 314 had a diameter of 1 m, a height of 1.8 m and a fluidized layer volume of 1400 lit. and the velocity reduction zone 316 had a maximum diameter of 1.4 m. Ethylene was continuously fed into the fluidized bed reactor 310 at a rate of 150 kg/hr and a vapor phase polymerization reaction was performed at 80° C.

Referring to FIG. 1, the recycling gas was cooled by the cooler of FIG. 2 and blown by means of the blower of the present invention (turboblower having a clearance S between impeller and labyrinth, as shown in FIG. 4, of 1 mm).

The results are given in Table 5. As apparent from the results of Table 5, the arrangement of the heat exchanger for cooling ahead of the blower according to the present invention enabled reducing the amount of recycling gas. Further, the blower can stably be operated for a prolonged period of time, and the inspection after the operation showed the absence of wear and breakage.

In contrast, the operation was conducted with the use of the common turboblower having a clearance S between impeller and labyrinth of 0.2 mm, resulting in abnormal vibration of the blower to thereby render the operation unstable. The inspection after the operation showed not only the presence of stringy polymer but also the wear and breakage of the impeller, casing and labyrinth seal.

TABLE 5

| Compsn. of recycling gas (mol %) | | | Temp. of heat exchanger outlet (° C.) | Gas vol* |
|---|---|---|---|---|
| N2 | ethylene | component of at least five C atoms | | |
| 35 | 58 | 7 | 46 | 89 |
| 30 | 48 | 22 | 42 | 73 |

Note*: volume of gas provided that the volume is 100 when no cooling is effected.

What is claimed is:

1. A method of vapor phase polymerization, which comprises blowing a gaseous monomer from a bottom of a fluidized bed reactor through a distributor plate into the fluidized bed reactor by means of a blower while feeding a solid catalyst for polymerization into the fluidized bed reactor to thereby form a fluidized bed in the fluidized bed reactor and carrying out a vapor phase polymerization reaction in the fluidized bed to thereby produce a polymer or copolymer, wherein the blower has a slide or rotational slide part between its discharge side as a high pressure side and its suction side as a low pressure side in a blower body casing, said slide or rotational slide part being provided with a noncontacted gas leakproof seal part at a clearance ranging from 0.7 to 2.5 mm.

2. The method as claimed in claim 1, wherein the gas leakproof seal part is provided at a clearance ranging from 0.9 to 1.2 mm.

3. The method as claimed in claim 1, wherein the solid catalyst for polymerization is a solid catalyst for olefin polymerization, the gaseous monomer is a gaseous olefin monomer and an olefin polymer or copolymer is obtained by the vapor phase polymerization reaction in the fluidized bed.

4. The method as claimed in claim 1, wherein unreacted gaseous monomer is discharged from the fluidized bed reactor and is caused to pass through a gas recycling path having a heat exchanger disposed upstream thereof and having a blower disposed downstream thereof so that the heat exchanged gaseous monomer is blown into the fluidized bed reactor.

5. The method as claimed in claim 4, wherein the gaseous monomer fed by the blower comprises a component which condenses at a temperature ranging from 50° C. lower than a temperature at which the vapor phase polymerization reaction is conducted in the fluidized bed to the temperature of vapor phase polymerization reaction.

6. The method as claimed in claim 5, wherein the gaseous monomer is fed into the fluidized bed at a temperature which is lower than the condensation temperature of the condensing component.

7. A method of vapor phase polymerization, which comprises blowing a gaseous monomer from a bottom of a fluidized bed reactor through a distributor plate into the fluidized bed reactor by means of a blower while feeding a solid catalyst for polymerization into the fluidized bed reactor to thereby form a fluidized bed in the fluidized bed reactor and carrying out a vapor phase polymerization reaction in the fluidized bed to thereby produce a polymer or copolymer, wherein the blower has a slide or rotational slide part between its discharge side as a high pressure side and its suction side as a low pressure side in a blower body casing, said slide or rotational slide part being provided with a noncontacted gas leakproof seal part being provided with a noncontacted gas leakproof seal part at a clearance ranging from 0.7 to 2.5 mm, wherein the solid catalyst for polymerization is a solid catalyst for olefin polymerization, the gaseous monomer is a gaseous olefin monomer and an olefin polymer or copolymer is obtained by the vapor phase polymerization reaction in the fluidized bed, and wherein unreacted gaseous monomer is discharged from the fluidized bed reactor and is cause to pass through a gas recycling path having a heat exchanger disposed upstream thereof and having a blower disposed downstream thereof so that the heat exchanged gaseous monomer is blown into the fluidized bed reactor.

8. The method as claimed in claim 7, wherein the gas leakproof seal part is provided at a clearance ranging from 0.9 to 1.2 mm.

9. The method as claimed in claim 7, wherein the gaseous monomer fed by the blower comprises a component which condenses at a temperature ranging from 50° C. lower than a temperature at which the vapor phase polymerization reaction is conducted in the fluidized bed to the temperature of vapor phase polymerization reaction.

10. The method as claimed in claim 9, wherein the gaseous monomer is fed into the fluidized bed at a temperature which is lower than the condensation temperature of the condensing component.

* * * * *